No. 12,078. REISSUED FEB. 3, 1903.

D. T. OWEN.

COMBINED COUCH AND FOLDING BED.

APPLICATION FILED NOV. 26, 1902.

2 SHEETS—SHEET 1.

ATTEST

A. H. Wilcox

INVENTOR.

David T. Owen

BY H. T. Fisher ATTY.

THE MORRIS PEYERS CO., PHOTO-LITHO., WASHINGTON, D. C.

No. 12,078. REISSUED FEB. 3, 1903.

D. T. OWEN.

COMBINED COUCH AND FOLDING BED.

APPLICATION FILED NOV. 26, 1902.

2 SHEETS—SHEET 2.

ATTEST.

T. B. Moser

A. U. Moser.

INVENTOR.

David T. Owen

BY H. T. Fisher ATTY

UNITED STATES PATENT OFFICE.

DAVID T. OWEN, OF CLEVELAND, OHIO.

COMBINED COUCH AND FOLDING BED.

SPECIFICATION forming part of Reissued Letters Patent No. 12,078, dated February 3, 1903.

Original No. 707,628, dated August 26, 1902. Application for reissue filed November 26, 1902. Serial No. 132,960.

*To all whom it may concern:*

Be it known that I, DAVID T. OWEN, a citizen of the United States, residing at Cleveland, in the county of Cuyahoga and State of Ohio, have invented certain new and useful Improvements in a Combined Couch and Folding Bed; and I do declare that the following is a full, clear, and exact description of the invention, which will enable others skilled in the art to which it appertains to make and use the same.

My invention relates to a combined couch and folding bed; and the invention consists in the construction and combination of parts, substantially as shown and described, and particularly as pointed out in the claims.

Figure 1:
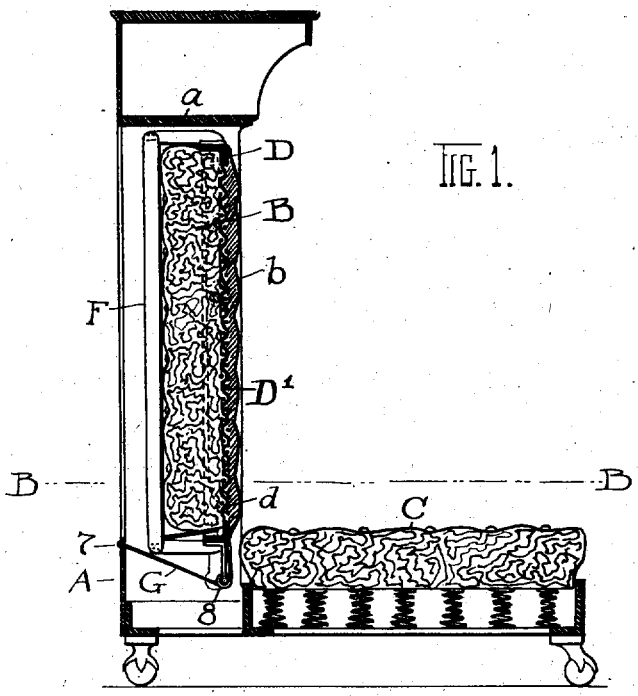
Figure 2:
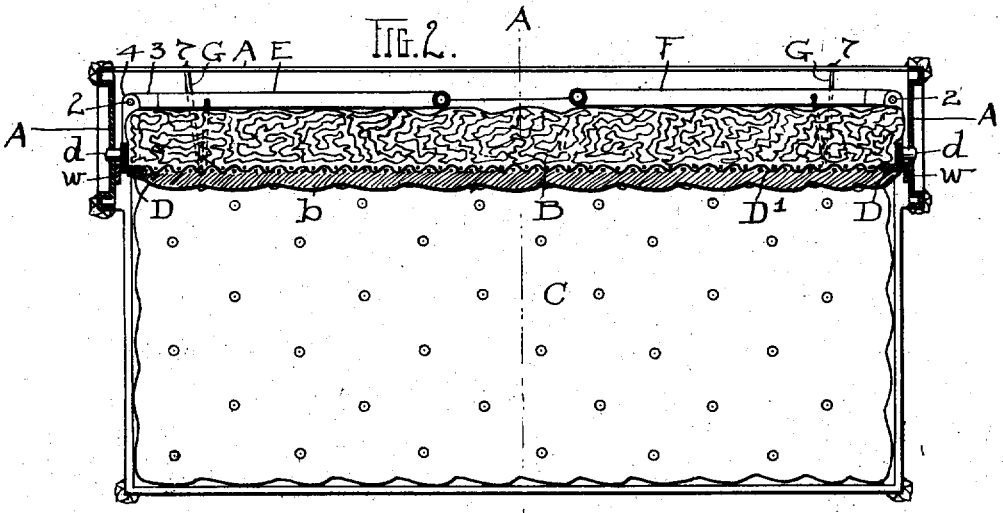
Figure 3:
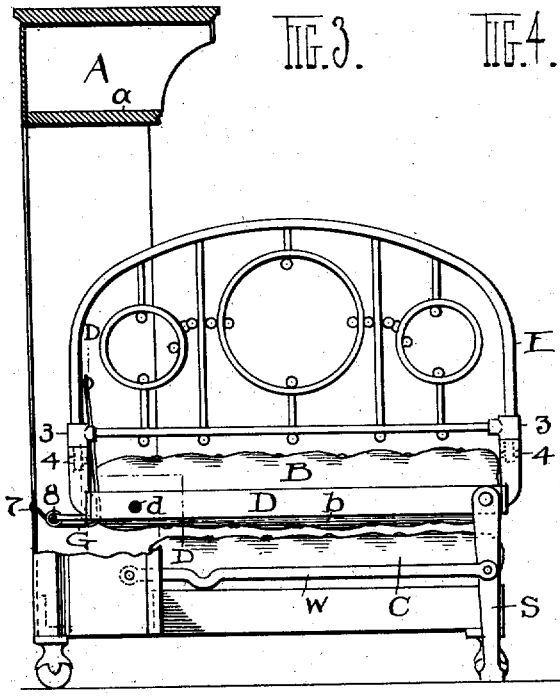
Figure 4:
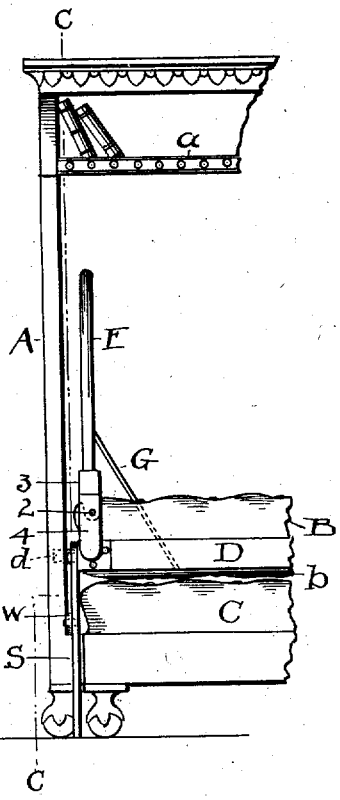
Figure 5:
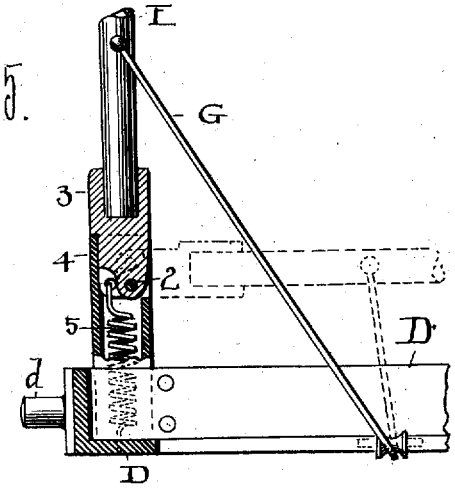

In the accompanying drawings, Figure 1 is a vertical sectional elevation of my invention on a line corresponding to A A of Fig. 2, and Fig. 2 is a plan view on line B B of Fig. 1. Fig. 3 is a cross-section on line C C of Fig. 4, which gives practically an end view of the couch and bed and a cross-section of the upper part of the casing or supporting-frame. Fig. 4 is a front elevation of one end of the entire structure, showing the bed down and in use and in this position resting over and above the couch-seat. Fig. 5 is a sectional elevation on line D D of Fig. 3, showing the spring-tension mechanism for holding the end frames of the bed in raised position and the associated mechanism for drawing the said end frames down upon the bed, all as hereinafter fully described.

In this instance I have combined the idea of a permanent couch-seat with a folding bed and back for the couch, as hereinafter fully described.

A represents the main casing, cabinet, or frame, which is shown as a rigid right-angled structure having a couch-seat C built into its horizontal portion, and a frame D, which is a combined bed and couch-back folding frame supported on pivots *d* on the main frame and adapted to be turned into horizontal and vertical positions, respectively, on said pivots. Couch-seat C conforms to the length of casing or frame A, and mattress B and frame D are of corresponding length to the couch and so completely fill the space at their ends within frame A that to all appearances the back-surface *b* of the couch is permanently built into said frame at its edges. Upon the whole, therefore, when the bed is folded and the back of the couch is up there is the appearance simply of a couch with a back and nothing more in so far as couch-seat C and back-finishing *b* and frame A are concerned.

The frame A is provided with a book or bric-a-brac shelf *a*, which presumably runs the entire length thereof at its top. I can therefore place either books or bric-a-brac upon this shelf, or I can construct this top portion of the frame with different fanciful designs, so as to completely divest it of its real character as a frame or support for a folding bed, and thus make it both useful and ornamental for purposes wholly disassociated from its character as a bed-frame.

E and F represent the respective head and foot or end frames of the bed. Said frames are folded down upon the mattress or bed on pivots 2 when the bed is folded, and thus not only get out of the way, but serve the useful purpose of bearing against the top of the bed and holding the bedding in place. I might construct these parts so that the said end frames E and F would be both raised and lowered exclusively by hand, with suitable provision for locking them in raised position; but I prefer to so construct them that they may be automatically controlled, at least in part, and thus be raised and lowered when the mattress-frame and mattress are raised and lowered for use. To these ends I provide the said frames with socket and pivot members 3, which are pivoted in the tubular standards 4, fixed rigidly upon bed and couch frame D, and which contain strong spiral springs 5 for each corner of the frames E and F. One end of these springs is fastened down in posts or standards 4, and the other end of each spring is engaged to the socket and pivot member 3 of the end frame at one side of pivot 2 of said frame, and the said springs are so arranged that they normally pull and hold frames E and F in erect or raised position when the bed is down in use, as seen in Figs. 3, 4, and 5. Then in order to automatically fold the said frames E and F down upon or against the top of the bed or bed-mattress, as seen in Figs. 1 and 2, I provide a wire or suitable cord G, which is fixed at one end to each of said frames E and F some distance above its pivot and at the other end 7 to the rear of the main frame or casing A, Fig. 1, and an arm 8, with a sheath in its end, is fixed upon each end of frame D and bears upon the corresponding wire or cord G to cause it to draw down upon the end frames E and F, to which it is attached, and thus compel said frames to fold inward against the tension or pull of the spring 5 when the mattress and its frame are being raised. The two working positions of arm 8 are shown in Figs. 1 and 3, respectively, said arm being up in Fig. 3 and down in Fig. 1, and when said arm projects downward, as in Fig. 1, the pull upon wire G has been such as to draw the corresponding end frame E or F down upon the mattress. Then as the mattress and its frame are lowered for use and the pull upon the wire G by arm 8 is relaxed toward the position in Fig. 3 the spring 5 asserts its tension and automatically raises end frames E and F to an upright position, as seen in Fig. 5.

It will be understood that the construction and operation of both end frames are alike in all the foregoing particulars, so that a description for one serves for both, and they both operate at the same time.

The foregoing description sets forth one way of automatically controlling the end frames E and F through the operation of raising and lowering the folding frame D; but I do not consider myself as at all limited to these, but may substitute any equivalent therefor if I desire to use any automatic mechanism at all for this purpose. I might, as I have already stated, omit this mechanism and raise and lower said frames by hand; but I very much prefer automatic means for doing this work.

When the bed is down in use, I support its outer edge by means of legs S, pivoted thereon and adapted to be raised and lowered automatically through bars W, pivotally secured at their other ends to the main frame or casing. When the bed is raised, said bar draws the leg to the side and in line with frame D, and when it is lowered it fixes the leg upright.

The foregoing description covers a single bed overreaching the couch-seat. I might on the same principle construct a double couch and bed or a double couch and single bed or a double bed and single couch and not depart from the spirit and character of my invention.

What I claim as my invention, and desire to secure by Letters Patent, is—

1. In a combined couch and bed, a rigid right-angled couch and bed frame having a couch-seat in the horizontal portion thereof and a folding frame pivoted in its upright portion above the plane of the couch-seat and provided with a mattress and finishing overspreading the bottom of the mattress, said folding frame provided with folding supports for its outer portion, substantially as described.

2. A main frame having a horizontal portion for a couch and an upright portion for a bed, in combination with a folding frame pivoted on said main frame and provided with a mattress and a finishing for the back of the couch overspreading the bottom of said mattress, and a couch-seat in the horizontal portion of said main frame, substantially as described.

3. In a combined bed and couch, a supporting-frame, in combination with an open folding frame adapted to be turned to vertical and horizontal positions thereon, and a bed-mattress in said folding frame having a finished bottom forming the back of the couch, substantially as described.

4. In a combined bed and couch, a supporting-frame, in combination with an open frame adapted to be turned into vertical and horizontal positions and constructed to support a bed-mattress and back for the couch, and means to support a mattress in said folding frame when in a vertical position, substantially as described.

5. In a combined bed and couch, a supporting frame and a couch-seat, a mattress-carrying frame pivoted on said supporting-frame and a bed-mattress having its bottom covered with a finishing for the back of the couch, and means to automatically support the mattress when raised to a vertical position, substantially as described.

6. A combined couch and bed frame, in combination with a folding frame adapted to be lowered over the couch-seat, head and foot frames for the bed pivoted on said folding frame, and mechanism connecting said head and foot frames with the said folding frame and constructed to fold said frames when the folding frame is raised, substantially as described.

7. A main frame for a combined couch and bed, in combination with a folding frame pivoted on said main frame and constructed to be lowered over the couch-seat for use as a bed and to be folded up in said main frame when out of use as a bed and a mattress in said frame having its bottom finished to form the back of a couch, head and foot sections of the bed pivoted on the said folding frame and arranged to rest behind the bed when it is in a raised position, and means to fold said head and foot sections automatically when the bed is folded, substantially as described.

8. The combined couch and bed comprising a main frame and a couch-seat, a folding frame adapted to be folded down over the couch-seat, head and foot frames independently pivoted on said folding frame, and mechanism between said head and foot frames and said folding frame adapted to fold and unfold the said frames when said folding frame is raised and lowered, substantially as described.

Witness my hand to the foregoing specification this 24th day of November, 1902.

DAVID T. OWEN.

Witnesses:
H. T. FISHER,
A. U. MOSER.